(12) United States Patent
Gabler et al.

(10) Patent No.: US 9,582,376 B2
(45) Date of Patent: Feb. 28, 2017

(54) UNIFIED COMMUNICATIONS MODULE (UCM)

(71) Applicant: Invensys Systems, Inc., Foxboro, MA (US)

(72) Inventors: John Carl Gabler, Irvine, CA (US); Michael Kieu, Trabuco Canyon, CA (US); Peter P. Kral, Irvine, CA (US); Ajay P. Mishra, Irvine, CA (US)

(73) Assignee: Invensys Systems, Inc., Foxboro, MA (US)

( * ) Notice: Subject to any disclaimer, the term of this patent is extended or adjusted under 35 U.S.C. 154(b) by 154 days.

(21) Appl. No.: 14/541,809

(22) Filed: Nov. 14, 2014

(65) Prior Publication Data

US 2016/0139999 A1    May 19, 2016

(51) Int. Cl.
| | |
|---|---|
| *G06F 11/00* | (2006.01) |
| *G06F 11/20* | (2006.01) |
| *H04L 12/703* | (2013.01) |
| *G05B 9/00* | (2006.01) |
| *G05B 19/418* | (2006.01) |

(52) U.S. Cl.
CPC .......... *G06F 11/2007* (2013.01); *G05B 9/00* (2013.01); *G05B 19/41855* (2013.01); *H04L 45/28* (2013.01); *G05B 2219/31245* (2013.01); *G05B 2219/33273* (2013.01)

(58) Field of Classification Search
CPC .......... H04L 2012/40208–2012/40267; G05B 19/0425; G05B 19/0428; G05B 19/048; G05B 19/058; G06F 11/2007
See application file for complete search history.

(56) References Cited

U.S. PATENT DOCUMENTS

| | | | |
|---|---|---|---|
| 6,975,966 B2* | 12/2005 | Scott .................. | G05B 23/0272 700/4 |
| 7,149,655 B2 | 12/2006 | Frederick et al. | |
| 7,719,961 B2 | 5/2010 | Sichner et al. | |
| 7,813,813 B2 | 10/2010 | Muneta et al. | |
| 7,813,820 B2 | 10/2010 | Opem et al. | |
| 8,055,814 B2 | 11/2011 | Sichner et al. | |
| 2011/0069698 A1 | 3/2011 | Schmidt et al. | |
| 2011/0178611 A1* | 7/2011 | Daraiseh ............ | G05B 19/4184 700/80 |
| 2013/0268798 A1 | 10/2013 | Schade et al. | |

* cited by examiner

*Primary Examiner* — Michael Maskulinski
(74) *Attorney, Agent, or Firm* — Stephen Manetta; Ralph Graham (57) ABSTRACT

A fault tolerant control system delivers an embedded functional safety core and a distributed control engine with an onboard communication link in an industrial process control environment. The fault tolerant control system includes a process control workstation connected to a first network and a fault tolerant safety controller connected to a second network, wherein a process controller module, a safety controller module and a field device system integration module are co-located on a power interface board.

22 Claims, 8 Drawing Sheets

UNIFIED COMMUNICATIONS MODULE (UCM)

BACKGROUND

In a process control system, such as a distributed control system (DCS), fault tolerance enables continued operation in the event components within the system fail, or in the event the system experiences transient faults from various sources. One aspect common to fault tolerant systems involves the concept of redundancy, which can be simply defined as back up components that become operational when a failure occurs, allowing the system to continue to operate as intended. A safety instrumented system (SIS) is known in the art for continuing operation in a "safe state" to avoid adverse safety and health consequences through the use of a fault tolerant controller. Such fault tolerant controllers are often used in hazard protection systems (i.e., systems that regulate nuclear plant operation, turbomachinery, fire and gas sensing systems, and the like).

The control components of known fault tolerant controllers employ parallel control and extensive diagnostics to ensure uninterrupted process operation. One example of a fault tolerant controller is the TRICON controller available from Invensys Systems, Inc. The TRICON controller has a triple modular redundant (TMR) architecture that employs three isolated, parallel control systems and extensive diagnostics integrated into one system. The system uses two-out-of-three voting to provide high integrity, error-free, uninterrupted process operation with no single point of failure. Fault tolerant controllers of this type interface with, among various other components, modules of the process control system that have control functionality as well as communication functionality.

Any improvements that increase the efficient interoperation (in terms of protocol support, applications, or graphical user interface navigation of the system) of the SIS with the process control system, while simultaneously preserving safety functionality, are highly desirable. Various improvements related to minimizing the number of hardware components required to implement a fault tolerant controller, as well as allowing the controller to interface efficiently with the process control system, have been attempted without complete success.

SUMMARY

Briefly, aspects of the present invention relate to a unified communications module (UCM) that delivers an embedded functional safety core and a distributed control engine with an onboard communication link in an industrial process control environment. Advantageously, aspects of the invention enable redundancy between controllers of the regulatory, or control, portion of a process control system, such as a DCS, to provide a full uninterrupted, fault tolerant, redundant, pair-configurable control network. In addition, aspects of the invention permit integrating a switch between the safety core and a field device system integrator (FDSI), which collects data from various field devices such as pumps, valves, and flow meters and communicates the data to the DCS application interface. This enables the safety application to read and write aliased control data while preventing changes to the safety controller from control network sources.

One aspect of the present invention comprises a fault tolerant control system with a process control workstation connected to a first network and a fault tolerant safety controller connected to a second network, wherein a process controller module, a safety controller module, and a field device system integration module are co-located on a power interface board.

In another aspect, a communications interface for a fault tolerant controller comprises the power interface board with a three-port switch configured to interface the safety controller module and the field device system integration module, which results in the communications interface appearing as a control station on a regulatory network.

In yet another aspect, a fault tolerant controller comprises a modified backplane interface, a main processor, and a power interface board. The modified backplane interface is configured to interlink redundant power interface boards.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of this invention relate to hardware and software components for use in distributed process control environments, more specifically, to integrating the functionality of process control-related hardware and software. A UCM embodying aspects of the invention comprises a semi-fault tolerant, 3-to-1 interface between its communication ports and the main processors (MPs) of a fault tolerant controller.

Figure 1:
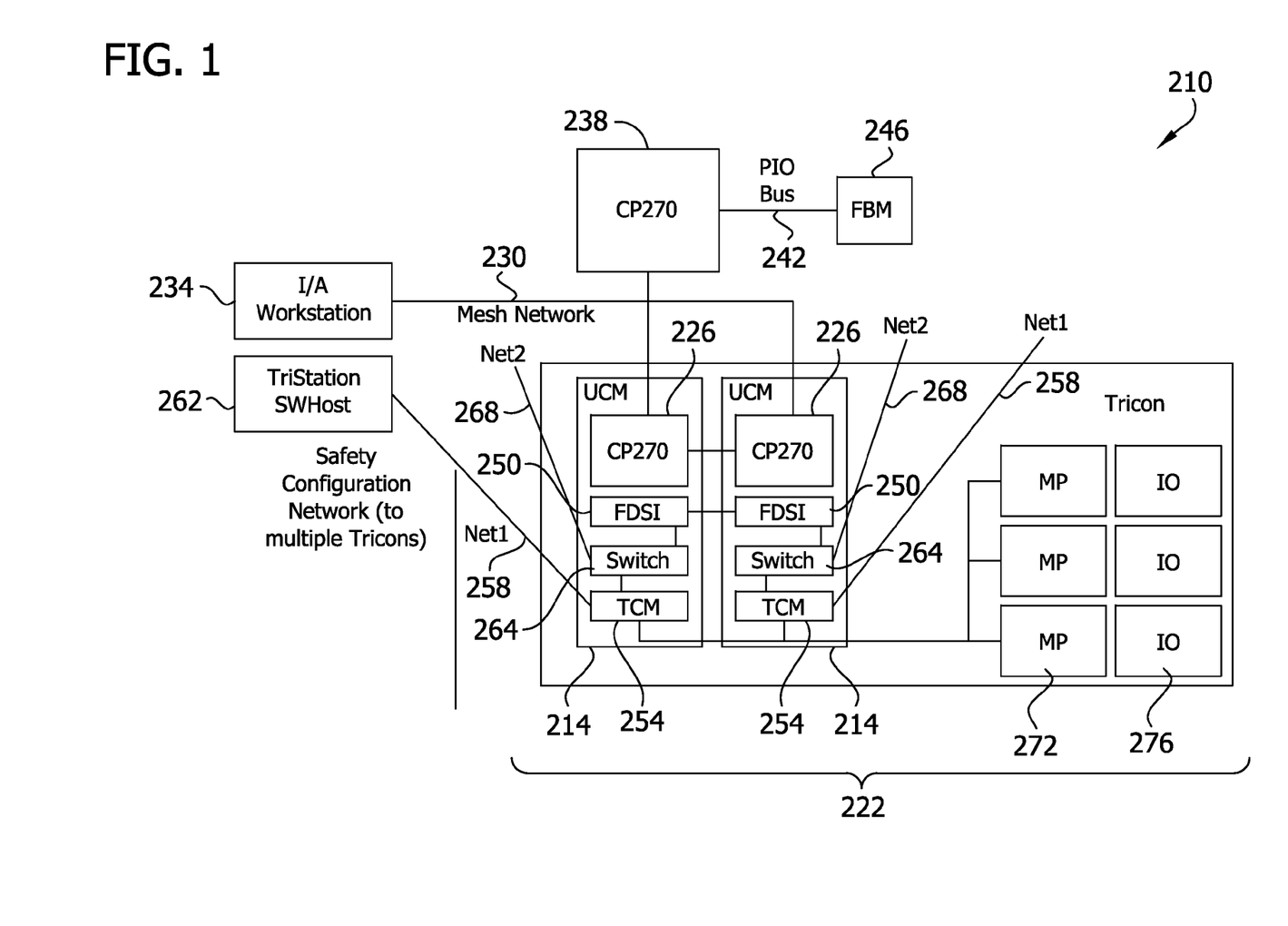
FIG. 1 is a diagram depicting a UCM and various relevant communications networks interfaced by the UCM according to one embodiment of the invention.

Turning to FIG. 1, a fault tolerant controller embodying aspects of the invention is generally indicated at 210. A UCM 214 is depicted as viewed within a chassis 222 of the fault tolerant controller 210. In an embodiment, fault tolerant controller 210 includes a plurality of UCMs 214 operating independently and capable of providing true control network redundancy, as will be further described below. Three separate modules are depicted within the UCM 214, which provide, among other benefits, physical and functional separation of at least two distinct networks. A control processor 226 is the first module relevant to the UCM. The control processor 226 provides regulatory, logic, timing, and sequential control through a Mesh network 230, which is the regulatory network that connects each UCM's control processor 226 to a workstation 234 running process control automation software. Additionally, in an embodiment, the Mesh network 230 connects to a control processor that is then connected through, for example, a parallel input/output (PIO) bus 242 to a fieldbus module 246 of the process control system. In an embodiment, a suitable control processor 226 is a Control Processor CP270 available from Invensys Systems, Inc.

Referring further to FIG. 1, an FDSI 250 collects data from various field devices, such as pumps, valves, and flow meters, and communicates the collected data to the Mesh network 230. An exemplary FDSI 250 is an FBM233 Field Device System Integrator Module available from Invensys Systems, Inc. Also, one or more safety modules 254 embedded in fault tolerant controller 210 allow for the flexible communication between safety instrumented systems that implement the aforementioned "safe state" and the distributed control systems in one embodiment. For example, the safety module 254 is embodied by a TRICON Communication Module (TCM). The safety modules 254 are interconnected through a Safety Configuration Network, referred to as "Net1" 258, which connects multiple fault tolerant controllers. Additionally, a safety workstation 262 is connected to Net1 258.

Further, a three-port switch 264, such as an Ethernet switch, connects safety module 254, FDSI 250, and a third network, referred to as "Net2" 268. In this embodiment, communication signals pass through the processor of FDSI 250 before reaching control processor 226. Communication signals must separately pass through various components within the chassis 222 before reaching the safety devices operatively connected to fault tolerant controller 210, including, among other components, at least one main processor 272 operatively connected to safety module 254, and at least one I/O card 276.

The communication protocol used at the three-port switch 264 comprises a shared protocol capable of sending communications to FDSI 250 as well as to safety module 254. One exemplary protocol used at three-port switch 264 to communicate throughout Net2 268 comprises a protocol, such as TRICONEX System Access Application (TSAA), that enables client/server communication between safety controllers and personal computers. Two exemplary client/server programs utilizing TSAA protocol to exchange data with fault tolerant safety controllers include OPC Server and DDE Server. TSAA protocol can also be used to write other programs for affecting access points in SISs for safety integrity level (SIL) 3 or SIL 2 applications. TSAA protocol is distinct from the protocol used by the DCS components on Mesh network 230. The integration of three-port switch 264 into UCM 214 permits the SIS to read and write aliased control data while maintaining write protection to lock out all changes to a safety controller that originates from sources within the process control system communicating using Mesh network 230 in one embodiment. This dual functionality enables secure communication via three-port switch 264, while maintaining a distinct separation between the communication taking place in Mesh network 230, as opposed to that taking place in Net1 258.

The UCM 214 is a type of distributed control system interface module capable of providing, among other benefits, the following additional communication features to the fault tolerant safety system:

Single or redundant module operation,

One logical slot or two physical slots of UCMs in the system (SLOT 2-COM slot). Module keying shall conform to the TRICON Standard of Module Keying, Two optically isolated RS-232/RS-485 Serial ports per UCM, with firmware configurable from TMR TRISTATION for Modbus, GPS, etc.

Two 10/100 Base Fiber network ports are available per UCM; more specifically, two fiber-optic mode Ethernet ports with LC connectors, and 2 fiber-optic mode Ethernet ports with MT-RJ connectors are available, resulting in network connections on the UCM comprising fiber optic connections, All ports are capable of providing 500 VDC galvanic isolation from TRICON Logic Ground (FE), TCP/IP/TSAA network protocols supported on both network ports for TRISTATION, SOE, TRILOG, HP printer, WONDERWARE HMI and other DDE compatible applications, V9 Peer to Peer and V9 Time synchronization protocols supported on network ports, Optional Global Time Synchronization receiver interface, using Modbus port one, TMR COMM bus consisting of three 2 Mb HDLC RS485 Communication channels, one for each TRICON Main Processor (MP) leg, UCM development ports: One optically isolated RS-232 debug port and JTAG connection per UCM, Based on MOTOROLA MPC8270 QUICC.

In suitable embodiments, various protocols are capable of being implemented in various networks of the UCM, including Net1 258 as well as Net2 268. Regarding application protocols, suitable protocols include TCP/IP for Network-connected TCP/IP printers and Modbus Master or Slave communications. Also, Simple Network Time Protocol (SNTP) is available. Further, in terms of UDP/IP protocol, application protocols include TRICONEX Time Synchronization, TSAA Client/Server Communication with IP Multicast, and TRICONEX Peer-to-Peer. And TRISTATION and TSAA Client/Server Communication are available. Regarding network protocols available on Net1 258 and Net2 268, TCP/IP, SNTP, UDP/IP, and Internet Control Message Protocol (ICMP) are available.

Advantageously, fault tolerant controller 210, including UCM 214, supports sequence of event (SOE) data, which differs from real-time data in that the data is saved and buffered by fault tolerant controller 210 to preserve its time stamp and order of occurrence. This is an improvement over the Advanced Communication Module (ACM), which better enabled the TRICON controller to interface with the DCS. Although the ACM improved integration between safety and process control, it presented issues related to redundancy, speed, and system configuration solved by fault tolerant controller 210. Furthermore, the ACM required the use of additional hardware, and did not support a number of desirable features.

In an embodiment, the UCM 214 features control processor 226 that is nearly identical to a regulatory control processor external to the safety system. The control processor 226 in UCM 214 includes additional features such as upgradable control software and 100 base FX Fiber Ethernet. Also, the use of the featured control processor 226 enables the addition of hardware and application software to DCS and system management tools for supporting the UCM 214. The use of this control processor 226 results in the holistic presentation of information from the SIS systems to the DCS, including SOE and SIS time stamped data, system health, equipment health, and other information. Also, regulatory control addressing, such as MAC address and SLOT ID, can be configured and set just as they would be set in a regulatory control processor external to the safety system, as well as in the FDSI 250.

Additionally, control hardware can be migrated with changes without impacting safety functionality. Further, the control network can be added online without the addition of hardware or software, an improvement that was accomplished by considering form factor, heat dissipation, power sequencing, and power dissipation.

The fault tolerant controller 210 also provides improvements over alternatives to the ACM. For example, configuring a control processor (providing regulatory, logic, timing, and sequential control) with an FDSI, and including safety modules placed in the chassis of a fault tolerant controller, likewise cannot provide the advantages of fault tolerant controller 210, including UCM 214, embodying aspects of the invention. The control processor 226 and FDSI 250 are connected to the fault tolerant controller 210 through cables. Redundancy may be provided for in other ways, such as by providing an additional control processor and FDSI outside of the chassis, or by placing an additional control processor and an additional FDSI on a single baseplate. But in this embodiment, the cables from the redundant components are connected to TSAA ports, requiring the consumer to pay for the additional ports necessary to implement the alternative configuration, and increasing the installation time required.

Aspects of the present invention replaces the ACM and the conventional alternative configuration, and represents significant advancements in terms of integrating the SIS/DCS connection, such as enabling redundancy between controllers of the regulatory, or control, portion of a process control system, such as the DCS, to provide a full uninterrupted, fault tolerant, redundant, pair-configurable control network. In addition, aspects of the invention permit integrating a switch between the safety core and a field device system integrator (FDSI), which collects data from various field devices such as pumps, valves, and flow meters and communicates the data to the DCS application interface. This enables the safety application to read and write aliased control data while preventing changes to the safety controller from control network sources. Moreover, a fault tolerant controller embodying aspects of the invention permits adding serial ports to the backplane to supplement the dense UCM module front panel interface connections, and adding an Ethernet switch to interface with the safety network. Also, the backplane is preferably customized to accommodate additional control network signals, including specific slots for the UCM 214.

Furthermore, Mesh network Ethernet connections are added to the UCM module front panel, which provides a streamlined front panel connection between Mesh network hardware and software and the MP modules, after considering factors such as form factor, heat dissipation, power sequencing, and power dissipation.

Figure 2:
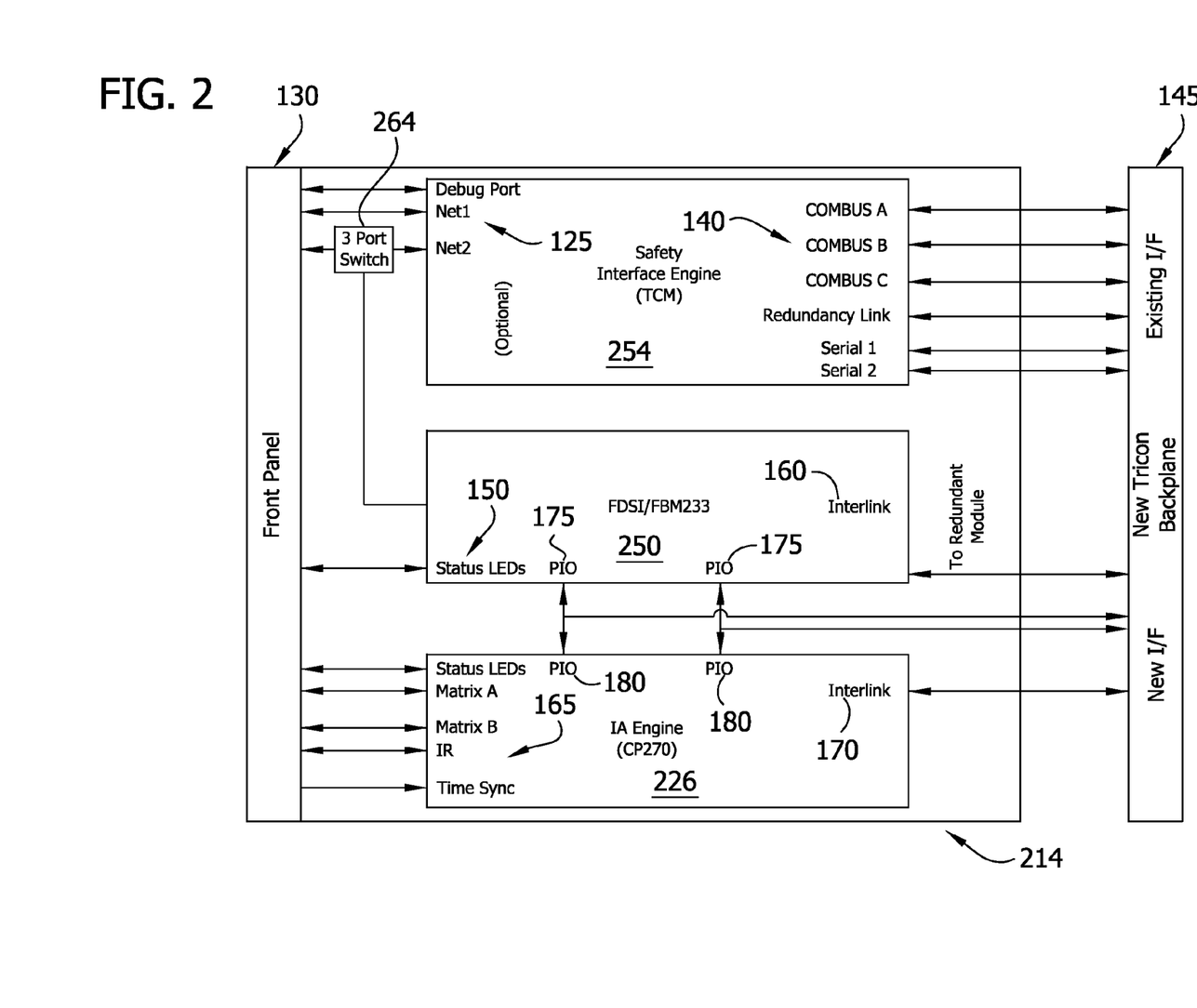
FIG. 2 is a diagram depicting three UCM components according to one embodiment of the invention.

FIG. 2 depicts a block diagram of the three components of UCM 214 along with other connections to various modules and to various networks in one embodiment of the present invention. The control processor 226, also referred to as an I/A Engine, is a distributed, optionally fault-tolerant, field-mounted controller that performs process control and alarming functions according to a user-defined control strategy. The software system design is driven by a distributed control system software, such as FOXBORO EVO or FOXBORO I/A SERIES available from Invensys Systems, Inc. The FDSI 250 integrates safety devices, such as TRICON and TRIDENT devices, using the TSAA protocol into an I/A SERIES system. As above, the software design is driven by a distributed control system software, such as FOXBORO EVO or FOXBORO I/A SERIES available from Invensys Systems, Inc. The safety module 254, also known as the Safety Interface Engine (SIE), is embodied by a modified TCOM and is the main controller board of the module. The safety module 254 is the interface to the SIS (also called the TRICON Safety System) and is responsible for the health and status of the entire module and diagnostics, and dictates the entire bootup of the system (including when the control devices come online).

Referring further to FIG. 2, various interfacing capabilities of the components of UCM 214 are provided by various types of connections that allow for the display of status indications and for connectivity in accordance with various aspects of the present invention. Among other interfacing capabilities, front panel interfaces 125 of safety module 254, such as those labeled debug port, Net1, and Net2, interface with a front panel 130 of chassis 222. For example, the debug port is designed to have 2 KV isolation, implemented by safety module 254. Debug port isolation is accomplished via a transformer, while data signals pass through optocouplers. Additionally, interfacing is provided in part through three-port switch 264 that will be described in further detail as capable of providing a structural and functional separation between distinct networks. Rear panel interfaces 140 of safety module 254, such as those labeled COMBUS A, COMBUS B, COMBUS C, redundancy link, serial 1, and serial 2, provide an existing interface via the rear panel of chassis 222, comprising a backplane 145.

Still referring to FIG. 2, FDSI 250 further comprises front panel interfaces 150, such as interfaces displaying status LEDs and interfaces to three port switch 264, as well as rear panel interfaces 160, such as an interlink to a redundant module via new interfaces. Further, control processor 226 further comprises front panel interfaces 165, such as status LEDs, and those labeled matrix A, matrix B, IR, and time sync; as well as rear panel interfaces 170 to the backplane 145, such as an interlink to a redundant module via new interfaces. Finally, interfacing via PIO connections 180 and PIO connections 175 provide interfacing between control processor 226 and FDSI 250; as well as between both modules and backplane 145.

Figure 3:
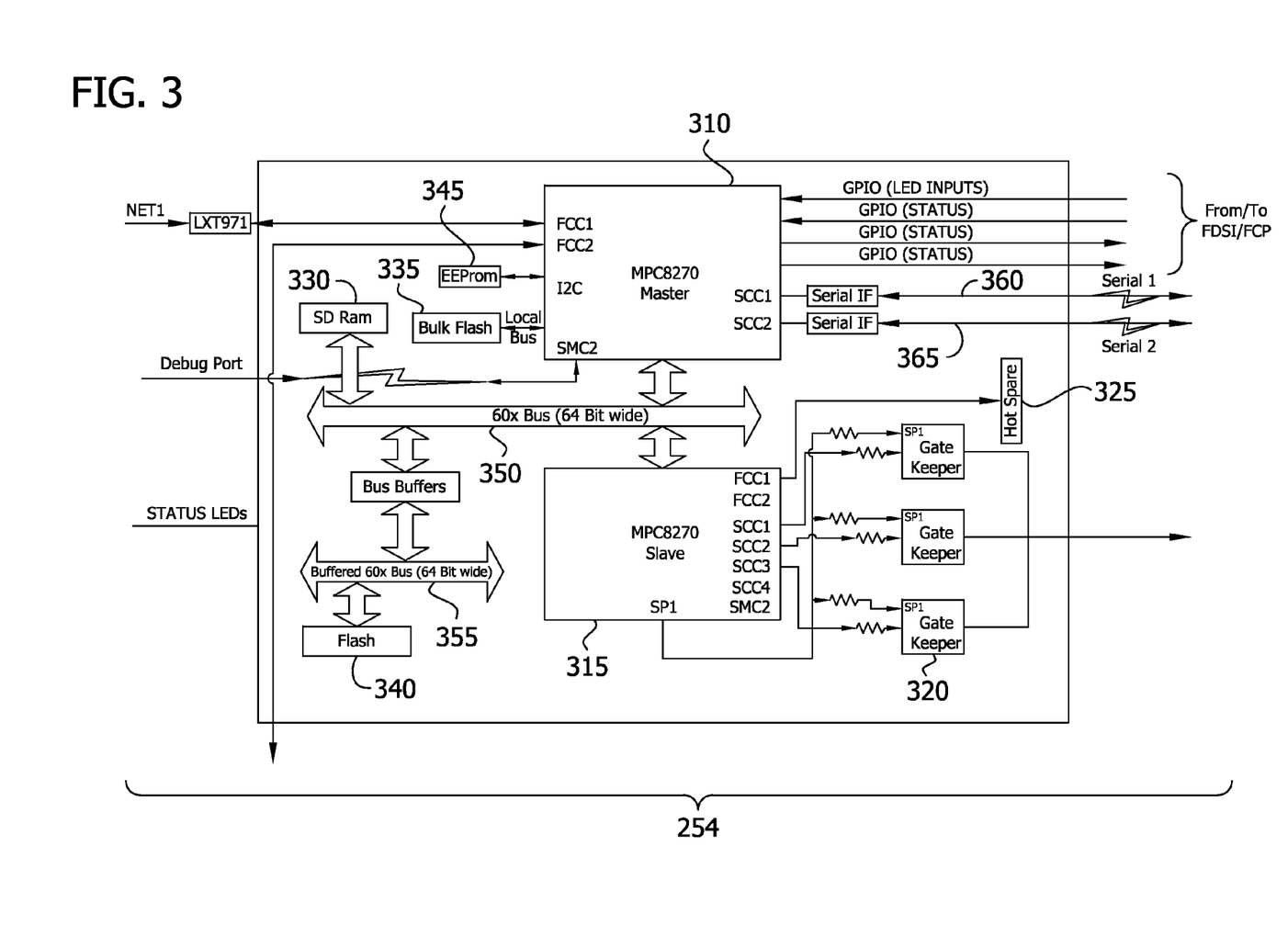
FIG. 3 is a block diagram of the first of three UCM components according to one embodiment of the invention.

FIG. 3 depicts a block diagram of the first of three UCM components, namely, safety module 254, in one embodiment of the present invention. A first "Master" microprocessor 310, illustrated here as an MPC8270, performs high level protocol functions. A second "Slave" microprocessor 315, also illustrated here as an MPC8270, performs COMBUS communication functions. Other components include components servicing the slave microprocessor 315, including at least one Gatekeeper complex programmable logic device (CPLD) 320 and a hot-spare connection 325. Further components and connections are envisioned, such as SD RAM devices 330, bulk flash 335 and flash memory components 340, EEPROM components 345, 60× bus 350 and 60× buffered bus 355 connections, and serial interfaces including a serial 1 interface 360 as well as a serial 2 interface 365.

Figure 4:
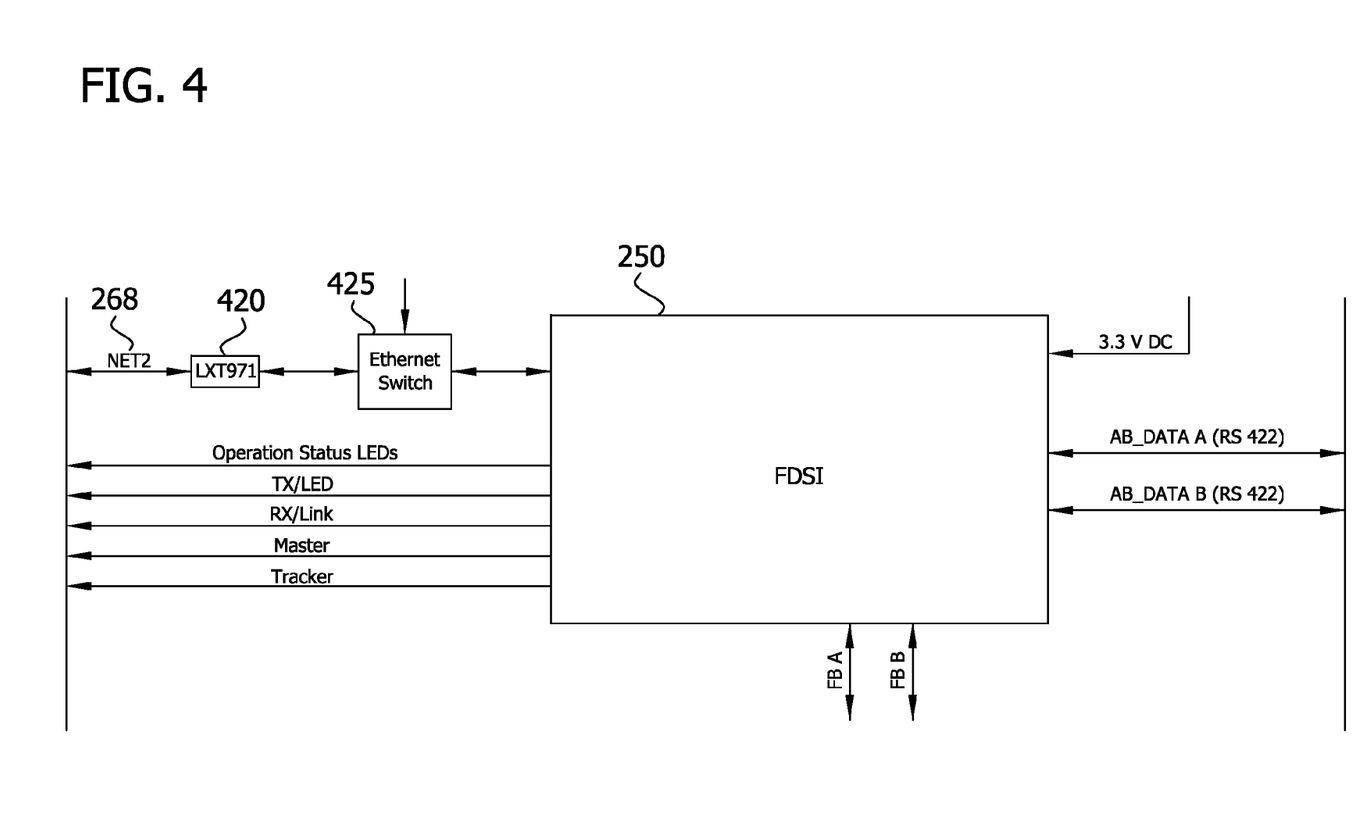
FIG. 4 is a block diagram of the second of three UCM components according to one embodiment of the invention.

FIG. 4 is a block diagram of the second of three UCM components, namely, FDSI 250, in one embodiment of the present invention. The FDSI 250 is depicted with various relevant interfacing connections. To accommodate two printed circuit board assemblies (PCBAs) in UCM 214, the PCBAs are merged to create a single PCBA. Physical layers, transceivers, and status indicators, components that were previously housed on an FDSI, are on a UCM power interface board (PIB). As will be further explained, Net2 268 is connected via an LXT 971 transceiver 420 and an Ethernet switch 425, which embodies three-port switch 264, to the FDSI 250 and provides, among other functions, the capability of maintaining physically and functionally distinct networks between the Mesh network 230 and Net1 258.

Figure 5:
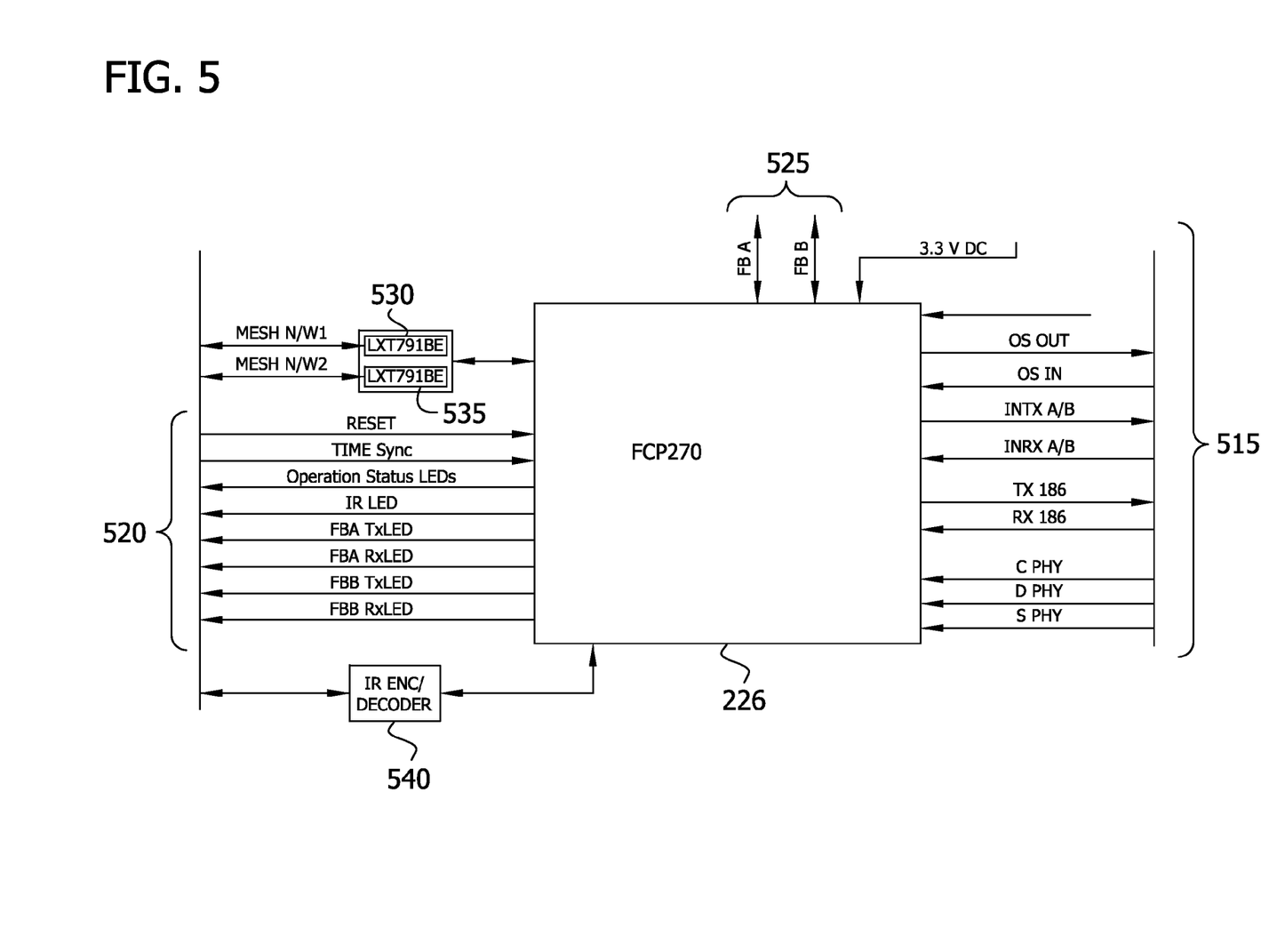
FIG. 5 is a block diagram of the third of three UCM components according to one embodiment of the present invention

FIG. 5 is a block diagram of the third of three UCM components, namely, a control processor 226, in one embodiment of the present invention. In an embodiment, control processor 226 interfaces with various components and indicators, such as status light indicators, via various rear panel interfacing connections 515 as well as various front panel interfacing connections 520. In an embodiment, the control processor 226 interfaces with modules such as FDSI 250 via FDSI interfacing connections 525. In an embodiment, interfacing is accomplished by a first LXT971 based Ethernet physical layer (PHY) 530 and second LXT971 based Ethernet PHY 535, as well as by an IR Encoder/Decoder 540.

Figure 6:
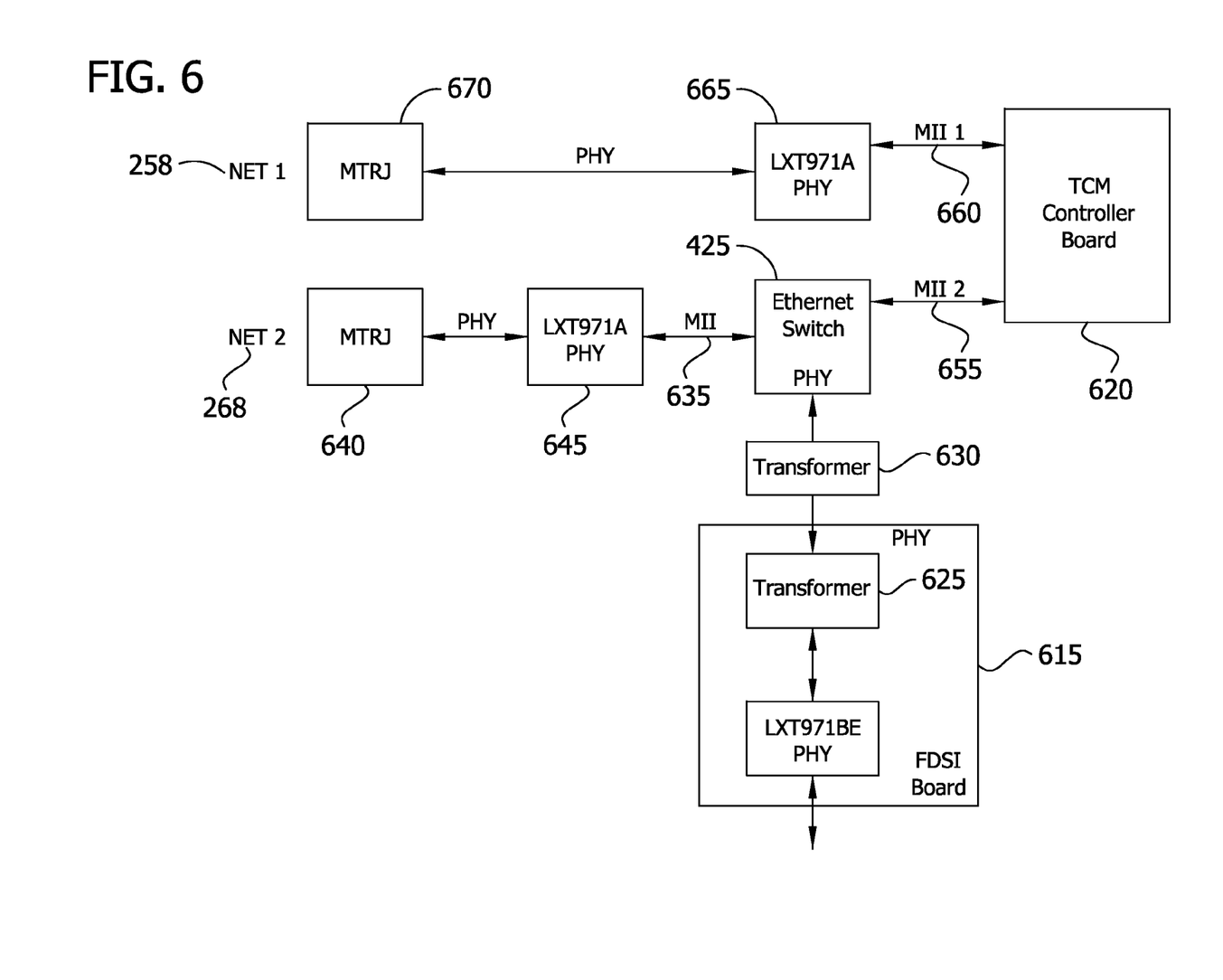
FIG. 6 is a block diagram of an Ethernet switch and relevant structural components in one embodiment of the present invention.

FIG. 6 is a block diagram of Ethernet switch 425 and relevant structural components in one embodiment of the present invention. The Ethernet switch 425, for example an 88E6060 Ethernet switch, is used in the UCM PIB to communicate between an FDSI board 615 (e.g., a control board of FDSI 250) and a safety controller board 620 (e.g., a control board of safety module 254) while maintaining functional and physical separation between the Mesh network 230 and Net1 258. Transformers 625 and 630 provide communications between the FDSI board 615 and the Ethernet switch 610. An MII connection 635 between the Ethernet switch 425 and a first MTRJ connection 640 through a first LXT971A transceiver 645 provides for, among other things, a connection to an external network Net2 268. An MII2 connection 655 between the Ethernet switch 610 and the safety controller board 620 communicates through an MII1 connection 660 to a second LXT971A transceiver 665 which in turn communicates through a second MTRJ connection 670 providing for, among other things, a connection to Net1 258, which also comprises an SIS network in one embodiment.

Still referring to FIG. 6, it is to be understood that in an embodiment, as communications signals are routed from Net2 268 to the FDSI board 615 via transformers 625 and 630, the signals must transmit through at least a first processor located on FDSI board 615. It is to be understood that in an embodiment, as communications signals are routed from Net2 268 to the safety controller board 620 via MII2 655, the signals must transmit through at least a second processor located on the safety controller board 620. In an embodiment, it is to be understood that the signals transmitting through the first processor located on the FDSI board 615 are eventually transmitted to devices in Mesh network 230. In an embodiment, it is to be understood that the signals transmitting through the second processor located on the safety controller board 620 are eventually transmitted to devices in the SIS network.

In FIG. 6, it is to be understood that the Ethernet switch 425 is configured during initialization to shield data from Net2 268 from reaching transformers 625 and 630. This shielding is accomplished by configuring the Ethernet switch 425 using software implemented during initialization. It is to be understood that VLAN is implemented at the Ethernet switch 425 to control communication with the FDSI board 615. As is well known in the art, VLAN is a programmable way to "hardwire" a set communication path in a multi-port switch to prevent packets from being broadcast to every port, and provides additional security and data logging functions.

Configuring the Ethernet switch 425 as a VLAN design eliminates any extraneous messages from the mesh network 230 from reaching the safety controller board 620 through the FDSI board 615. Among the benefits provided by the elimination of these extraneous messages includes providing TUV certification for control processor components, which is not the case when they are external to the chassis 222 of the fault tolerant controller 210. As is well known in the art, TUV certification requires a customer to demonstrate, among other things, that the safety instrumented system is not interfered with by external interfaces, by meeting rigid timing requirements defined for specific applications. For example, for Burner management there is a specified time limit (e.g., in milliseconds) for the safety module 254 of a safety controller to close a gas feed line when a flameout has occurred. In order to guarantee the feed line is closed within the specified time limit, no external interface to the main processor 272 that is operatively connected to safety module 254 may interfere. TUV certification is now capable of being applied to components that were previously external to the fault tolerant controller 210, because mesh network 230 communications within the UCM are certified not to interfere with communications to the SIS interface, the safety module 254.

It is to be understood that the configuration of the UCM 214 prevents external interference in various ways. It is to be understood that the repackaging of equipment by integrating the safety module 254, the FDSI 250, and the control processor 226 prevents external interference by preventing access to the internal boards. It is to be understood that the Ethernet switch 425 is configured by internal configuration logic that cannot be adjusted by external interference. An additional benefit of the internal configuration logic is to eliminate human error setting up a VLAN which can be complicated and require network expertise. Configuring a VLAN between the safety module 254 and the FDSI 250, as well as between the safety module 254 and a PHY transceiver 645, results in benefits similar to those realized through the implementation of a firewall, such as increased data protection, communication security, decreasing communications interference between the safety module 254, the FDSI 250, and the control processor 226, and data integrity.

More specifically, it is to be understood that the VLAN improves data integrity by allowing for the replacement of the cabling between the Net2 268 port and FDSI 250 ports with a shorter connection implemented on a printed circuit board. It is to be understood that the Ethernet switch 425 is configurable via a computer. And it is to be understood that the ports on the Ethernet switch 425 are configurable during initialization by the software so that the DCS by way of the FDSI board 615 is shielded by incoming data from Net2 268 and that only the SIE by way of the safety controller board 620 will receive the incoming data.

Figure 8:
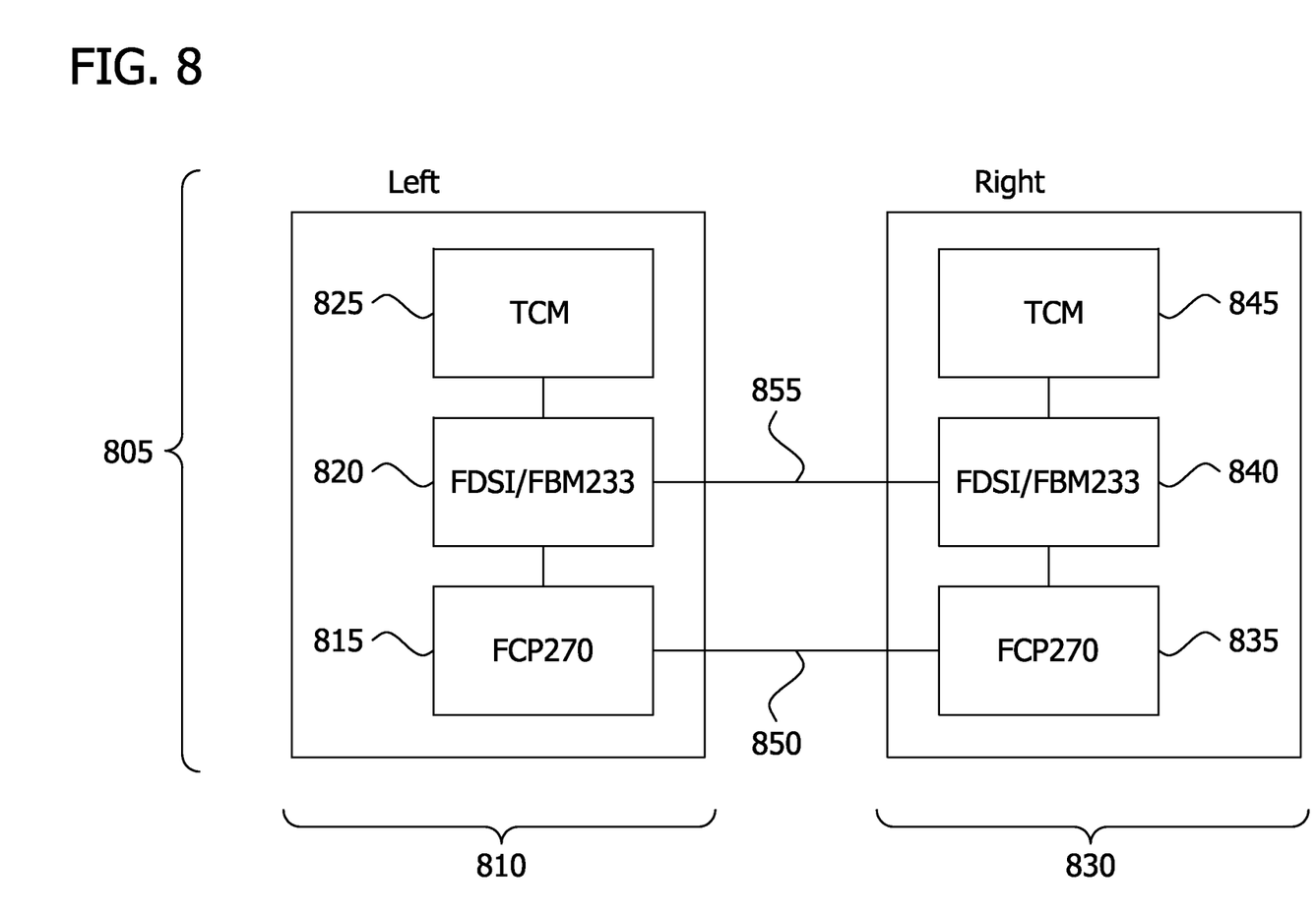
FIG. 8 is a block diagram depicting a functional redundancy feature of the UCM in accordance with one aspect of the invention.

FIG. 8 depicts redundant UCMs 214 installed in chassis 222 in accordance with one embodiment of the present invention. The backplane 145 includes a serial port 810 connecting to a serial cable 815. A Mesh network fiber cable 820 from the UCM 214 communicates with Mesh network 230 through a Mesh splitter/combiner 825 and Mesh fiber cables 827 to, for example, workstation 234 of the process control system. In an embodiment, a first UCM 830 (e.g., UCM 214) and a second UCM 835 (e.g., UCM 214) are installed in a redundant configuration in SLOT 2 of the chassis 222. Additionally, redundant power supplies 840, a first of three main processors 845 installed in a triple redundant configuration, and safety controller 254 (or SIE) are installed in chassis 222 in one embodiment.

Figure 7:
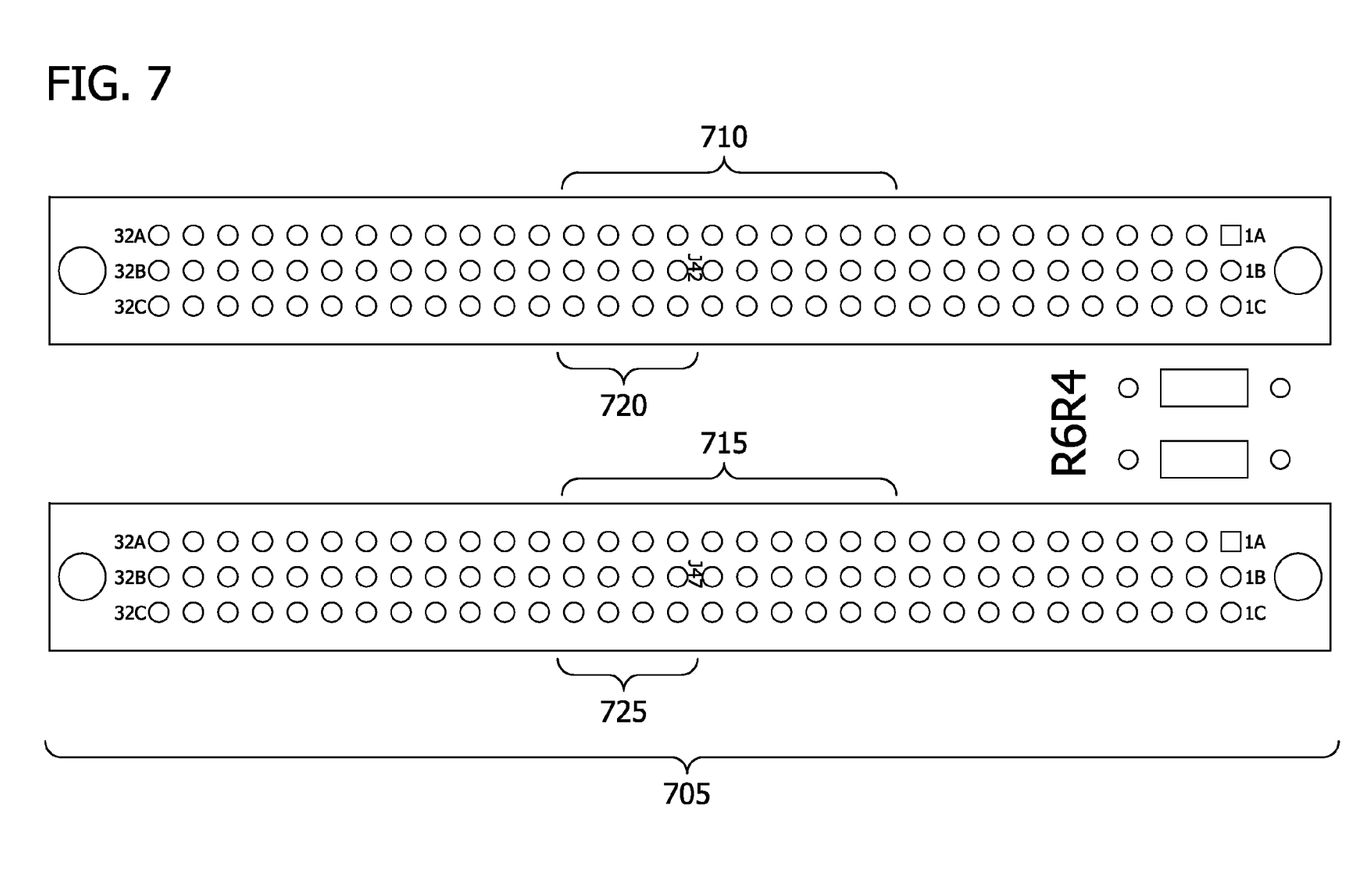
FIG. 7 depicts a detailed view of a back plane slot used by the UCM, in accordance with one embodiment of the present invention.

FIG. 7 depicts a detailed view of the back plane slot used by the UCM, in accordance with one embodiment of the present invention. More specifically, the J42 and J47 backplane connections generally indicated by 705 are depicted in greater detail and described by Appendix A, which further describes the relevant connections by PIN number. In an embodiment, a left-side series of control processor inter link bus connections 710 connecting to a first control processor module housed in a first redundant UCM (e.g. UCM 214) are interlinked via a customized backplane to a right-side series of control processor inter link bus connections 715 connecting to a second control processor module housed in a second redundant UCM (e.g. UCM 214). In an embodiment, a left-side series of fieldbus module inter link bus connections 720 connecting to a first FDSI module housed in first redundant UCM (e.g. UCM 214) are interlinked via a customized backplane to a right-side series of fieldbus module inter link bus connections 725 connecting to a second FDSI module housed in second redundant UCM (e.g. UCM 214).

FIG. 8 depicts a block diagram generally indicated at 805, depicting the functionality of the redundancy feature of the UCM 214 in accordance with one aspect of the invention. A left-side UCM 810 (e.g., UCM 214) further comprises a first control processor 815 (e.g., control processor 226), a first FDSI 820 (e.g., FDSI 250) and a first safety controller 825 (e.g., safety module 254). A right-side UCM 830 (e.g., UCM 214) comprises a second control processor 835 (e.g., control processor 226), a second FDSI 840 (e.g., FDSI 250), and a second safety controller 845 (e.g., safety module 254). The first control processor 815 and second control processor 835 are connected by a first interlink bus 850. The first FDSI 820 and second FDSI 840 are connected by a second interlink bus 855. In an embodiment, the first interlink bus 850 and the second interlink bus 855 are configured to communicate using the customized backplane as described with reference to FIG. 7 and Appendix A. For purposes of demonstration only, it is to be understood that if a UCM component fails, such as the first FDSI 820 of the left-side UCM 810 for example, a switch occurs to a redundant module such as the second FDSI 840 of the right-side UCM 830, which is made possible by the customized backplane connection via the first interlink bus 850. At the same time, a message notifies an operator that the first FDSI 820 needs to be replaced. The operator can physically remove the failed module, or force a switch from the module to the redundant module through the use of distributed control system (DCS) process management software. At the point of removal, the remaining component, for example the first control processor 815, switches to the redundant component as well.

Redundant UCMs 214 are installed in chassis 222 in accordance with one embodiment of the present invention. The backplane 145 includes serial ports connecting to serial cables. In an embodiment, the backplane 145 includes serial ports dedicated to the redundant UCMs 214. Mesh network fiber cables from redundant UCMs 214 communicate with Mesh network 230 through a Mesh splitter/combiner and Mesh fiber cables to, for example, workstation 234 of the process control system. In an embodiment, a first UCM (e.g., UCM 214) and a second UCM (e.g., UCM 214) are installed in a redundant configuration in SLOT 2 of the chassis 222. Additionally, redundant power supplies, a first of three main processors installed in a triple redundant configuration, and safety controller 254 (or SIE) are installed in chassis 222 in one embodiment.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow.

The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

APPENDIX A

Backplane-Power Interface Board Interfacing Connectors Pin-Outs 96 Pin DIN Male Connector; PINS A, B, and C

| Pin No A | Signal Name | Remarks |
| --- | --- | --- |
| 1 | FBDATPOSA | Field bus |
| 2 | FBDATNEGA | |
| 3 | FBSH | |
| 4 | JGSER_1 | |
| 5 | JRXD_1 | Serial Port-1 |
| 6 | JTXD_1 | |
| 7 | JDTR_1 | |
| 8 | JDSR_1 | |
| 9 | JGSER_1 | |
| 10 | OS_IN | State_Exchange CLK IN |
| 11 | INSH | Inter Link Bus from CP270 |
| 12 | INSH | |
| 13 | INTXNEGB | |
| 14 | INTXPOSB | |
| 15 | INRXNEGB | |
| 16 | INRXPOSB | |
| 17 | INTXNEGA | |
| 18 | INTXPOSA | |
| 19 | INRXNEGA | |
| 20 | INRXPOSA | |
| 21 | DPHY_SHIELD | D-Bus Common |
| 22 | DPHY_SHIELD | |
| 23 | DPHY_SHIELD | |
| 24 | DPHY_SHIELD | |
| 25 | CPHY_SHIELD | C-Bus Common |
| 26 | CPHY_SHIELD | |
| 27 | CPHY_SHIELD | |
| 28 | CPHY_SHIELD | |
| 29 | SPHY_SHIELD | State Bus Common |
| 30 | SPHY_SHIELD | |
| 31 | SPHY_SHIELD | |
| 32 | SPHY_SHIELD | |

| Pin No B | Signal Name | Remarks |
| --- | --- | --- |
| 1 | FBSH | Field bus |
| 2 | FBSH | |
| 3 | FBSH | |
| 4 | JCTS_2 | |
| 5 | JCD_2 | |
| 6 | JRTS_2 | |
| 7 | JCD_1 | |
| 8 | JRTS_1 | |
| 9 | JCTS_1 | |
| 10 | Logic GND | |
| 11 | Logic GND | |
| 12 | Logic GND | |
| 13 | Logic GND | |
| 14 | Logic GND | |
| 15 | Logic GND | |
| 16 | Logic GND | |
| 17 | Logic GND | |
| 18 | Logic GND | |
| 19 | Logic GND | |
| 20 | Logic GND | |
| 21 | DPHY_TPFON | D-Bus Ethernet Interface |
| 22 | DPHY_TPFOP | |
| 23 | DPHY_TPFIN | |

-continued

| Pin No B | Signal Name | Remarks |
|---|---|---|
| 24 | DPHY_TPFIP | |
| 25 | CPHY_TPFON | C-Bus Ethernet Interface |
| 26 | CPHY_TPFOP | |
| 27 | CPHY_TPFIN | |
| 28 | CPHY_TPFIP | |
| 29 | SPHY_TPFON | State Bus Ethernet Interface |
| 30 | SPHY_TPFOP | |
| 31 | SPHY_TPFIN | |
| 32 | SPHY_TPFIP | |

| Pin No C | Signal Name | Remarks |
|---|---|---|
| 1 | FBDATPOSB | Field bus |
| 2 | FBDATNEGB | |
| 3 | FBSH | |
| 4 | JGSER_2 | |
| 5 | JRXD_2 | Serial Port-2 |
| 6 | JTXD_2 | |
| 7 | JDTR_2 | |
| 8 | JDSR_2 | |
| 9 | JGSER_2 | |
| 10 | OS_OUT | State_Exchange CLK OUT |
| 11 | RXTX_SH | State_Exchange I/O Interface from CP270 |
| 12 | TX186NEG | |
| 13 | TX186POS | |
| 14 | RX186NEG | |
| 15 | RX186POS | |
| 16 | RXTX_SH | |
| 17 | AB_DT_POSA | Inter Link Bus from FBM233 |
| 18 | AB_DT_POSB | |
| 19 | AB_DT_NEGA | |
| 20 | AB_DT_NEGB | |
| 21 | DPHY_SHIELD | D-Bus Common |
| 22 | DPHY_SHIELD | |
| 23 | DPHY_SHIELD | |
| 24 | DPHY_SHIELD | |
| 25 | CPHY_SHIELD | C-Bus Common |
| 26 | CPHY_SHIELD | |
| 27 | CPHY_SHIELD | |
| 28 | CPHY_SHIELD | |
| 29 | SPHY_SHIELD | State Bus Common |
| 30 | SPHY_SHIELD | |
| 31 | SPHY_SHIELD | |
| 32 | SPHY_SHIELD | |

What is claimed is:

1. A fault tolerant control system comprising:
a process control system workstation operatively connected to a first network;
a fault tolerant safety controller operatively connected to a second network; and
an interface between the process control workstation and the fault tolerant safety controller, said interface comprising:
a process controller module operatively connected to the first network;
a safety controller module operatively connected to a second network;
a field device system integration module for communicating safety information from the safety controller module to the process controller module; and
a switch configured to selectively connect the safety controller module and the field device system integration module while maintaining a functional and physical separation between the first network and the second network;
wherein the process controller module, the safety controller module, and the field device integration module are co-located on a power interface board.

2. The fault tolerant control system claim 1, wherein the first network comprises a distributed control system (DCS) network, and wherein the second network comprises a safety instrumented system (SIS) network.

3. The fault tolerant control system of claim 2, wherein the interface is configured to implement a redundancy approach on the SIS network.

4. The fault tolerant control system of claim 3, wherein the interface is further configured to adapt the redundancy approach of the SIS network to the DCS network.

5. The fault tolerant control system of claim 2, wherein the interface is configured to implement a redundancy approach on the DCS network.

6. The fault tolerant control system of claim 2, wherein the interface is configured for the holistic presentation of information in the DCS network.

7. The fault tolerant control system of claim 6, wherein the information comprises SIS network information.

8. The fault tolerant control system of claim 6, wherein the information comprises one or more of the following: sequence of events (SOE) data, SIS time stamped data, system health data, and equipment health data.

9. The fault tolerant control system of claim 1, wherein the modules comprise a plurality of input/output (I/O) cards operatively connected to the power interface board.

10. The fault tolerant control system of claim 9, further comprising a chassis for housing the I/O cards and the power interface board.

11. The fault tolerant control system of claim 10, wherein the chassis further houses a backplane configured to receive the power interface board.

12. The fault tolerant control system of claim 1, wherein the switch comprises a three-port switch co-located on the power interface board, and wherein the three-port switch is configured to interface the safety controller module and the field device system integration module via a selective connection therebetween.

13. A communications interface for a fault tolerant controller, comprising:
a process controller module operatively connected to a regulatory network;
a safety controller module operatively connected to a safety network;
a field device system integration module for communicating safety information from the safety controller module to the process controller module; and
a three-port switch configured to interface the safety controller module and the field device system integration module via a selective connection therebetween;
wherein the three-port switch isolates communications from the process controller module via the field device system integration module to the safety controller module, and wherein the communications interfaces appears as a control station on the regulatory network.

14. The communications interface of claim 13, wherein the modules comprise a plurality of input/output (I/O) cards operatively connected to a power interface board.

15. The communications interface of claim 14, further comprising a chassis for housing the I/O cards and the power interface board.

16. The communications interface of claim 15, wherein the chassis further houses a backplane configured to receive the power interface board.

17. The communications interface of claim 13, wherein the three-port switch comprises an Ethernet switch.

18. The communications interface of claim 17, wherein the selective connection further comprises maintains a functional and physical separation between the regulatory network and the safety network.

19. A fault tolerant controller comprising:
- a modified backplane interface;
- a main processor operatively connected to the modified backplane interface; and,
- a power interface board operatively connected to the modified backplane interface, said power interface board comprising:
  - a process controller module;
  - a safety controller module operatively connected to the main processor;
  - a field device system integration module; and,
  - a three-port switch operatively connected to the safety controller module and the field device system integration module;
  - wherein the three-port switch is configured to interface the safety controller module and the field device system integration module via a selective connection therebetween.

20. The fault tolerant controller of claim 19, further comprising a second power interface board installed in a redundant configuration in the modified backplane interface.

21. The fault tolerant controller of claim 19, wherein the three-port switch further comprises an Ethernet switch.

22. The fault tolerant control system of claim 19, wherein the selective connection maintains a functional and physical separation between a first network and a second network.

* * * * *